UNITED STATES PATENT OFFICE.

WALTER M. RALPH, OF BUFFALO, NEW YORK, ASSIGNOR TO NATIONAL ANILINE & CHEMICAL CO., INC., OF NEW YORK, N. Y., A CORPORATION OF NEW YORK.

DISAZO DYE.

1,371,979.         Specification of Letters Patent.       Patented Mar. 15, 1921.

No Drawing.     Application filed April 24, 1920. Serial No. 376,277.

*To all whom it may concern:*

Be it known that I, WALTER M. RALPH, a citizen of the United States, residing at Buffalo, in the county of Erie, State of New York, have invented certain new and useful Improvements in Disazo Dyes; and I do hereby declare the following to be a full, clear, and exact description of the invention, such as will enable others skilled in the art to which it appertains to make and use the same.

The present invention relates to a new disazo dye which is of value for dyeing cotton, wool, silk, and other fibers, and which can be developed on the fiber. The invention includes the dyed fabrics or other materials, dyed with the new dyestuff, as well as the new dyestuff itself.

The new dyestuff can be obtained by diazotizing nitro Cleve's acid, coupling the diazo compound so obtained with mi-amino-p-cresol methyl ether, diazotizing the monazo compound thus produced and coupling the same in alkaline solution with gamma acid (2.8.6 aminonaphthol sulfonic acid), and finally reducing the nitro group, e. g., with sodium disulfid.

The following specific example will further illustrate the invention, the parts being by weight:

29 parts of the sodium salt of 1-amino-4-nitro-naphthalene-6 (or -7) monosulfonic acid, or a mixture thereof, hereinafter referred to as nitro Cleve's acid, in aqueous solution, are treated with 6.9 parts of sodium nitrite and the mixture is run gradually into a mixture of ice and water containing 29 parts of hydrochloric acid (20° Bé.). By proceeding in this manner, a smooth and rapid diazotization of the nitro Cleve's acid is effected. To the resulting cold diazo solution there is added gradually a cold solution of 13.7 parts of m-amino-p-cresol methyl ether in 350 parts of water and 12 parts of hydrochloric acid (20° Bé.). Coupling begins immediately and is complete in the course of about 2 hours. The solution can be tested in the usual way for an excess of either the diazo compound or the m-amino-p-cresol methyl ether with alkaline R-salt solution or diazotized p-nitranilin solution. When the coupling is complete the monoazo dye, which has separated as a brownish red product, is filtered off.

The monoazo dye is then stirred up with 500 parts of water and dissolved by the addition of sodium hydroxid sufficient to effect solution. To this solution is then added 6.9 parts sodium nitrite and diazotization is effected by running the mixture into ice water containing 29 parts of hydrochloric acid (20°Bé.). Diazotization takes place immediately with a partial separation of the diazo compound. The solution or suspension of the diazo compound thus produced is then added gradually to a cold solution of 23.9 parts of gamma acid (2.8.6-amino naphthol sulfonic acid) in water containing enough soda ash to dissolve the gamma acid (about 11 parts) and 25 to 35 parts of soda ash in excess. During the addition of the diazo compound the solution is tested to insure an excess of gamma acid, and an alkaline solution is maintained up to the end of the addition. After all the diazo compound has been added, stirring is continued for about 1 hour to allow completion of the coupling, after which the solution is heated to about 80° C. and the dyestuff separated in the form of its sodium salt by the addition of common salt (sodium chlorid). The dye is then filtered off.

The filtered dye thus obtained is then admixed with about 1000 parts of hot water and reduced at a temperature of about 70° C. by the gradual addition of a solution of sodium disulfid. The reduction is easily followed since the unreduced dye is of a purplish color which turns reddish on the addition of acid, whereas the reduced product is a greenish blue which turns a bright blue with acids. Addition of sodium disulfid is continued until no further development of the blue color is observed. Salt is then added to precipitate the dye in the form of its sodium salt, and the dye is then filtered, dried and ground.

In the dry and pulverized condition, the dye, in the form of its sodium salt, is a bluish black powder which dissolves in water with a blue color. Hydrochloric acid produces a blue precipitate from such solution. Sodium hydroxid produces little change. The dye dissolves in concentrated sulfuric acid with a greenish blue color, and the resulting solution on dilution with water yields a violet precipitate.

The new dye can be used to dye cotton, wool, silk, and other fibers, giving blue shades, which may be developed to give fast blue-black or green-black shades by diazotizing and developing on the fiber or fabric with beta-naphthol, m-phenylenediamin, m-tolylenediamin, resorcin, etc.

The dyed materials produced either by the action of the new dyestuff itself, or by developing the new dyestuff on the fiber or fabric, as well as the new dyestuff itself, form a part of the present invention.

I claim:

1. The herein described new disazo dye obtainable by diazotizing 1-amino-4-nitronaphthalene-6 (or -7) monosulfonic acid coupling with m-amino-p-cresol methyl ether, again diazotizing and coupling the diazotized intermediate with 2.8.6 aminonaphthol sulfonic acid, said dye, in the form of its sodium salt being a bluish black powder, soluble in water to give a blue solution from which hydrochloric acid produces a blue precipitate and soluble in concentrated sulfuric acid to give a greenish blue solution, said dye dyeing cotton, wool, silk, and other fibers, bluish shades which can be developed to give fast blue-black to green-black shades.

2. The herein described new dyes obtainable by diazotizing the new disazo dye of claim 1 and developing with a developing agent.

3. Materials dyed with the new disazo dye of claim 1.

4. Materials dyed with the new disazo dye of claim 1, said dye being developed on the fiber of the material.

In testimony whereof I affix my signature.

WALTER M. RALPH.